(12) United States Patent
Chung et al.

(10) Patent No.: US 6,506,356 B1
(45) Date of Patent: Jan. 14, 2003

(54) CATALYST FOR OXIDIZING HYDROGEN SULFIDE GAS AND METHOD FOR RECOVERING ELEMENTAL SULFUR USING THE SAME

(75) Inventors: Jong Shik Chung, Seoul (KR); Moon Young Shin, Pohang-shi (KR)

(73) Assignees: Envichem Co., Ltd. (KR); Pohang University of Science & Technology (KR)

( * ) Notice: Subject to any disclaimer, the term of this patent is extended or adjusted under 35 U.S.C. 154(b) by 0 days.

(21) Appl. No.: 09/685,302

(22) Filed: Oct. 10, 2000

(30) Foreign Application Priority Data

Oct. 11, 1999 (KR) ............................................ 99-43783

(51) Int. Cl.$^7$ ............................................ C01B 17/02
(52) U.S. Cl. ............................... 423/573.1; 423/576.8; 502/303; 502/304; 502/305; 502/324; 502/325; 502/340; 502/349; 502/350; 502/352; 502/353; 502/517
(58) Field of Search ........................ 423/573.1, 576.8; 502/353, 352, 350, 349, 517, 303, 304, 305, 324, 325, 340

(56) References Cited

U.S. PATENT DOCUMENTS

| | | | |
|---|---|---|---|
| 4,282,116 A | * 8/1981 | Reuter et al. ................. | 252/461 |
| 4,311,683 A | 1/1982 | Hass et al. ............... | 423/573 G |
| RE31,364 | * 8/1983 | Wise ............................ | 252/456 |
| 4,576,814 A | 3/1986 | Hass et al. ............... | 423/573 G |
| 5,034,369 | * 7/1991 | Hebrard et al. .............. | 502/304 |
| 5,043,309 | * 8/1991 | Najjar et al. ................. | 502/340 |
| 5,061,673 | * 10/1991 | Muan et al. ................. | 502/309 |
| 5,286,697 | 2/1994 | van den Brink et al. ... | 502/257 |
| 5,512,258 | 4/1996 | Bouyanov et al. .......... | 423/230 |
| 5,597,546 | 1/1997 | Li et al. .................. | 423/573.1 |
| 5,603,913 | 2/1997 | Alkhazov et al. ......... | 423/576.8 |
| 5,653,953 | 8/1997 | Li et al. .................. | 423/576.8 |
| 5,700,440 | 12/1997 | Li et al. ..................... | 423/231 |
| 5,891,415 | 4/1999 | Alkhazov et al. ........ | 423/573.1 |
| 5,994,259 | * 11/1999 | Brazdil, Jr. et al. ......... | 502/300 |
| 2002/0049136 | * 4/2002 | Kourtakis et al. .......... | 502/300 |

FOREIGN PATENT DOCUMENTS

EP 0078690 A2 11/1982

* cited by examiner

Primary Examiner—Stanley S. Silverman
Assistant Examiner—Timothy C. Vanoy
(74) Attorney, Agent, or Firm—Webb Ziesenheim Logsdon Orkin & Hanson, P.C.

(57) ABSTRACT

A catalyst for recovering elemental sulfur by the selective oxidation of hydrogen sulfide is represented by the following chemical formula:

$$V_a Ti_b X_c O_f$$

wherein, a is such a mole number that vanadium amounts to 5–40% by weight based on the total weight of the catalyst; b is such a mole number that titanium amounts to 5–40% by weight based on the total weight of the catalyst; X is an element selected from the group consisting of Fe, Mn, Co, Ni, Sb and Bi; c is such a mole number that X amounts to 15% by weight or less based on the total weight of the catalyst; and f is such a mole number that oxygen is contained to the final 100% by weight. The catalyst can recover elemental sulfur at high rates for a long period of time without being deteriorated in activity. The high catalytic activity is maintained even when excess water is present in the reaction gas.

14 Claims, No Drawings

CATALYST FOR OXIDIZING HYDROGEN SULFIDE GAS AND METHOD FOR RECOVERING ELEMENTAL SULFUR USING THE SAME

BACKGROUND OF THE INVENTION

1. Field of the Invention

The present invention relates, in general, to a catalyst for oxidizing hydrogen sulfide gas to elemental sulfur and, more particularly, to a catalyst capable of selectively oxidizing hydrogen sulfide gas even when it contains moisture. Also, the present invention relates to a method for recovering elemental sulfur from hydrogen sulfide gas using the catalyst.

2. Description of the Prior Art

Representative of air pollutants, hydrogen sulfide is a colorless, toxic gas, giving out a bad smell. Hydrogen sulfide is produced in large quantity as a main or side product of biological metabolisms or industrial processes. Once hydrogen sulfide, whose sources are various at present, is released to the air, living organisms, including humans, absorb or adsorb the toxic gas directly or indirectly. In this course, the living organisms may suffer a fatal blow owing to the serious toxicity of hydrogen sulfide. Further, industrial facilities are increasingly deteriorated when coming into contact with hydrogen sulfide.

Since it is virtually impossible to effectively remove hydrogen sulfide from hydrogen sulfide-contaminated air, the best policy is to reduce the amount of the hydrogen sulfide gas released to the air. In this regard, there is a tendency toward the strengthening of laws regulating the hydrogen sulfide discharging industries. However, regulation by law is not preferable because the hydrogen sulfide discharging industries make a contribution to national economy. Rather than controlling hydrogen sulfide sources, appropriately processing inevitably generated hydrogen sulfide in advance of the discharge of hydrogen sulfide to the air is desired. That is, preferable is that an appropriate desulfurization process is adopted at the end of various processes in industrial facilities.

When fossil fuels themselves are directly processed or used as energy sources, a large quantity of hydrogen sulfide is produced. Relevant industrial facilities are representatively exemplified by oil refineries, iron manufacturing plants, and power plants. The effects of the quantity of the hydrogen sulfide generated from such large-scale plant facilities are not limited to local contamination, but may directly pollute other nations or the entire globe. Thus, the removal of hydrogen sulfide is of particular concern to all nations at present.

Claus reaction for converting toxic hydrogen sulfide into elemental sulfur, which is non-toxic to the body and the environment is one of the most well-known hydrogen sulfide removing methods. In a hydrogen sulfide-removing method using Claus reaction, toxic hydrogen sulfide is oxidized to elemental sulfur by passing through a reaction system comprising one high temperature furnace and two or three catalyst reactors, where thermal oxidation and catalytic reaction occur.

In detail, in the thermal oxidation process, one-third of the fed hydrogen sulfide($H_2S$) is oxidized to sulfur dioxide($SO_2$) in the high temperature furnace maintained at 1,100–1,200° C. This thermal oxidation is explained by the following reaction formula 1:

$$2H_2S+3O_2 \rightarrow 2SO_2+2H_2O$$

In the catalyst reaction process, which is subsequent to the thermal oxidation process, unconverted hydrogen sulfide and the sulfur dioxide produced in the high temperature furnace are mixed in a molar ratio of 2:1 and converted elemental sulfur through the condensation reaction, named Claus reaction, represented by the following reaction formula 2:

$$2H_2S+SO_2 \leftarrow \rightarrow 3/n\ Sn+2H_2O$$

The Claus process including the condensation of the reaction formula 2 suffers limited sulfur-recovery efficiency for the following reasons, making it difficult to increase hydrogen sulfide treating efficiency to a desirable level.

First, because the Claus process according to the reaction formula 2 is reversible chemically and thermodynamically, the equilibrium conversion rate is limited.

Next, the forward reaction, as shown in the reaction formula 2, is smoothly progressed with maintenance of the stoichiometric molar ratio of hydrogen sulfide to sulfide dioxide at 2:1. However, the stoichiometric molar ratio is not easy to control into the quantitatively accurate value. Thus, the forward reaction rate is lowered.

Finally, it is somewhat difficult to remove the water produced by the forward reaction, so the reverse reaction of the reaction formula 2 may predominate over the forward reaction. Accordingly, there may be caused a result contrary to the desulfurization purpose of converting hydrogen sulfide to elemental sulfur.

When the Claus process is used to treat a volume of hydrogen sulfide, 3–5% of the volume of the hydrogen sulfide typically remains unreacted owing to the above-mentioned problems. Usually, such tail gas is incinerated for discharge to the air. Incineration of hydrogen sulfide leads to sulfur dioxide as a main product. This incineration has been blamed for the emission of the serious air pollutant sulfur dioxide.

To avoid the pollution of the air, the tail gas must be further treated. In fact, a number of Claus tail-gas treatment processes have been developed to increase the total sulfur-recovery efficiency. Most of the conventional Claus tail-gas treatment processes, which take advantage of the adsorption or absorption of hydrogen sulfide, however, have the disadvantage of inhibiting the continuous operation of the facilities because of producing wastes after the treatment or requiring separate, periodic recycle processes.

In the most efficient Claus tail-gas treatment process, the removal of toxic hydrogen sulfide utilizes a catalyst. For example, a tail gas containing sulfur is hydrogenated to give hydrogen sulfide which is then oxidized on a catalyst to elemental sulfur. The following reaction formula 3 explains this reaction:

$$2H_2S+O_2 \rightarrow 2/n\ Sn+2H_2O$$

The Claus tail-gas treatment processes following the reaction formula 3 are representative of a mobile direct oxidation process (MODOP), which is high in sulfur-recovery rate as disclosed in EP 0 078 690 A2, and a super-Claus process which is disclosed in U.S. Pat. No. 5,286,697.

In the MODOP, hydrogen sulfide is directly converted to elemental sulfur by being reacted with oxygen at the stoichiometric molar ratio (2:1) in the presence of a titanium dioxide ($TiO_2$)-based catalyst. Through the three-step process including the Claus process, the conversion of hydrogen sulfide to elemental sulfur is achieved at a rate of as high as 90% or higher. The MODOP requires that the moisture level of the reaction gas be reduced to less than 4% prior to the catalytic reaction as the catalyst may be functionally deteriorated by water poisoning. Thus, the MODOP has the prerequisite condition of conducting a dehydration process in advance of the catalytic process, causing complexity in the conversion procedure.

The super Claus process is similar to the MODOP, but more useful in terms of requiring no separate dehydration processes. In other words, the iron- or chrome-based catalyst used in the super Claus process is not seriously vulnerable to moisture. Therefore, the super Claus process allows hydrogen sulfide gas containing excess moisture to be directly converted to elemental sulfur, showing as high a sulfur-recovery efficiency as that of the MODOP. Instead of the dehydration as in MODOP process, however, a prerequisite process is needed to prevent the catalyst from being poisoned by water and limiting the reverse super Claus reaction. The activity of the catalyst cannot be maintained high enough to drive the super Claus reaction without excessively using oxygen at an amount ten-fold larger than the stoichiometric equivalent required in the reaction formula 3. Indeed, the super Claus chemical reaction is smoothly conducted when the hydrogen sulfide gas is maintained at the level of less than 1 vol %. If the amount of the hydrogen sulfide gas exceeds 2 vol %, the hydrogen sulfide is difficult to treat by the super Claus process.

Therefore, there remains a need for a catalyst that requires only the stoichiometric amount of hydrogen sulfide to drive the chemical reaction without being poisoned even in the presence of excess water (moisture). Thus far, there have not developed the catalysts which meet the above requirements.

In many patents, catalysts that show activity in the substantial absence of moisture or in the presence of less than 5% of moisture are disclosed.

For example, U.S. Pat. No. 4,311,683 describes a $V_2O_5$ catalyst supported on a non-basic carrier, with which the sulfur-recovery rate can be increased to 75–90% by reacting an acidic gas containing 500 ppm or 10 vol % of hydrogen sulfide with oxygen at the stoichiometric equivalent ratio at 232° C. under a pressure of 100 psig.

U.S. Pat. Nos. 4,444,743 and 4,576,814 disclose the two-component catalyst $V_2O_5$—$Bi_2O_3$ in the presence of which the sulfur recovery can be achieved at a rate of 70–80% at 246° C. or lower in an atmosphere containing about 3 vol % of moisture.

$VMoO_x$ and $VMg_x/SiO_2$ catalyst systems are disclosed in U.S. Pat. No. 5,653,953, a $Fe_2O_3$-based catalyst system containing Ce, Tn or Sb in U.S. Pat. No. 5,700,440 and a $Bi_2O_3$-based catalyst system containing Mo and V in U.S. Pat. No. 5,597,546. These catalyst systems are reported to afford a maximum sulfur-recovery rate of 95% when as low as 0.8–3 vol % of hydrogen sulfide is reacted with ten-fold larger equivalents than the stoichiometric amount of oxygen at 200–280° C.

U.S. Pat. Nos. 5,603,913 and 5,891,415 disclose an $Fe_AMg_BZn_CCr_DO_x$ catalyst (wherein, $0.5 \leq A \leq 10$, $0.1 \leq B \leq 1$, $0 \leq C \leq 1$, $0 \leq D \leq 1$, B+C=1) and an $Fe_AZn_BO_X$ catalyst (wherein $0.5 \leq A \leq 10$, $1 \leq B \leq 2$), respectively. Both the two catalysts are reported to guarantee a sulfur-recovery rate of 93% when hydrogen sulfide is reacted with oxygen in the stoichiometric equivalent ratio in the substantial absence of water.

An excess moisture-allowable reaction condition can be found in U.S. Pat. No. 5,512,258 which discloses an $A_{4\pm x}V_{2\pm y}O_9$ catalyst system (wherein A is selected from the group consisting of Mg, Ca and Zn, $0 \leq x \leq 0.2$, $0 \leq y \leq 0.5$). Reported is that a mix gas comprising 2 vol % of hydrogen sulfide, 1 vol % of sulfur dioxide and an appropriate stoichiometric amount (about 1 vol %) of oxygen is treated with a reaction gas containing 30 vol % of moisture at 220° C., the conversion rate of hydrogen sulfide can be increased to as high as 70% and 90% at the maximum. However, nowhere is mentioned the selectivity for sulfur. In addition, the sulfur-recovery rate does not reach a desired level.

Most of the conventional techniques, as mentioned above, show only the results which are obtained by conducting processes under the conditions containing no moisture or small amounts of moisture. When the catalysts in prior arts are used in practical conditions, which contain a large volume of moisture, the results promised by the patents cannot be guaranteed. Rather, when moisture is present in the sulfur produced at high temperatures, reverse super Claus reaction occurs owing to the alkalinity of the catalyst, producing sulfur dioxide as a by-product and lowering the sulfur selectivity. To circumvent the deterioration of sulfur selectivity even to a small degree, the conversion is conventionally conducted in a low temperature condition, for example, at 245° C. or lower. U.S. Pat. No. 4,311,683 and 5,512,258, however, teaches that, while working for a long period of time at such a low temperature, the catalyst $V_2O_5$ is converted to a sulfide such as $VO(SO_4)$ or $VS_x$, losing its catalytic activity gradually and finally to the dead point.

SUMMARY OF THE INVENTION

Therefore, it is an object of the present invention to overcome the above problems encountered in prior arts and to provide a catalyst for the selective oxidation of hydrogen sulfide, which can maintain a high sulfur-recovery rate even in the presence of excess moisture in the reaction gas at a low temperature condition of less than 245° C. as well as at a high temperature condition of 245–330° C. and exhibits no inactivation according to working time.

It is another object of the present invention to provide a method for recovering elemental sulfur by the selective oxidation of hydrogen sulfide, which is very effectively conducted in the presence of the catalyst even in a condition containing excess moisture.

In one embodiment of the present invention, there is provided a catalyst for selectively oxidizing hydrogen sulfide to elemental sulfur, represented by the following chemical formula 1:

$$V_aTi_bX_cO_f \qquad 1$$

wherein, a is such a mole number that vanadium amounts to 5–40% by weight based on the total weight of the catalyst; b is such a mole number that titanium amounts to 5–40% by weight based on the total weight of the catalyst; X is an element selected from the group consisting of Fe, Mn, Co, Ni, Sb and Bi; c is such a mole number that X amounts to 15% by weight or less based on the total weight of the catalyst; and f is such a mole number that oxygen is present to the final 100% by weight.

In one version of the embodiment, the catalyst further contains an element component Y selected from the group consisting of Cr, Mo, W, Zr, Zn, Sn and mixtures thereof, represented by the following chemical formula 2:

$$V_aTi_bX_cY_dO_f \qquad 2$$

wherein, a, b, c, f and X are each as defined above; and d is such a mole number that the element component Y amounts to 8% by weight or less based on the total weight of the catalyst.

In another version of the embodiment, the catalyst further contains an element component Z selected from the group consisting of Mg, Ca, Sr, Cs, La, Ce and mixtures thereof, represented by the following chemical formula, 3:

$$V_aTi_bX_cY_dZ_eO_f \qquad 3$$

wherein, a, b, c, f, X and Y are each as defined above; and e is such a mole number that the element component Z amounts to 8% by weight or less based on the total weight of the catalyst.

In a further version of the embodiment, the catalyst further contains element component Z selected from the groups consisting of Mg, Ca, Sr, Cs, La, Ce and mixtures thereof, represented by the following chemical formula 4:

$$V_aTi_bX_cZ_eO_f \qquad 4$$

wherein, a, b, c, f and X are each as defined above; and e is such a mole number that the element component Z amounts to 8% by weight or less based on the total weight of the catalyst.

In another embodiment of the present invention, there is provided a catalyst for selectively oxidizing hydrogen sulfide to elemental sulfur, represented by the following chemical formula 5:

$$V_aTi_bY_dO_f \qquad 5$$

wherein, a is such a mole number that vanadium amounts to 5–40% by weight based on the total weight of the catalyst;

b is such a mole number that titanium amounts to 5–40% by weight based on the total weight of the catalyst;

Y is an element selected from the group consisting of Mo, Zr, Zn, Ce, Sn and mixtures thereof;

d is such a mole number that Y amounts to 8% by weight or less based on the total weight of the catalyst; and f is such a mole number that oxygen is contained to the final 100% by weight.

In one version of this embodiment, the catalyst further contains an element component Z selected from the groups consisting of Mg, Ca, Sr, Cs, La, Ce and mixtures thereof, represented by the following chemical formula 6:

$$V_aTi_bY_dZ_eO_f \qquad 6$$

wherein, a, b, d, f and Y are each as defined above; and e is such a mole number that the element component Z amounts to 8% by weight or less based on the total weight of the catalyst.

The catalysts may be metal composite oxides. Alternatively, the catalysts may be dispersed and supported on non-acidic or non-alkaline carrier particles. This is preferred because the catalytically active particles can be reduced in amount with an increase in surface area. As for the carrier, it is selected from the group consisting of titanium dioxide, silicon carbide and silicon dioxide. In the case of using titanium dioxide as a carrier, the Ti component contained in the metal composite oxide may be omitted. When being supported on a carrier, the catalytically active metal composite oxide preferably amounts to 5–50% by weight based on the total weight of the catalyst comprising the carrier.

In accordance with a further embodiment of the present invention, there is provided a method for recovering elemental sulfur by selectively oxidizing a reaction gas containing 0.5–40 vol % of hydrogen sulfide with oxygen in the presence of the catalyst.

DETAILED DESCRIPTION OF THE INVENTION

In the method of the present invention, reaction gas containing $H_2S$ preferably contains moisture at an amount of 50 vol % or less based on the total volume of a reaction gas containing $H_2S$. The reaction between the reaction gas and oxygen is conducted at 200–350° C. with a volume ratio of oxygen to hydrogen sulfide ranging from 0.5 to 1. The reaction gas is fed at a space velocity of 3,000–1,000,000/hr. More preferably, the reaction gas is fed at a space velocity of 3,000–400,000/hr and reacted with oxygen at 200–280° C. with a volume ratio of oxygen to hydrogen sulfide ranging from 0.5 to 0.6.

The oxidation of hydrogen sulfide on the metal composite oxide results from the catalytic oxidation-reduction mechanism in which the catalyst is reduced by the hydrogen sulfide to lose lattice oxygen and gas phase oxygen donates lattice oxygen to restore the catalytic activity of the catalyst. Therefore, the activation of the oxidation and its maintenance depend on the quantity of lattice oxygen within the vanadium which is the main catalytic element and on the reoxidation of the catalyst by gas phase oxygen, which is facilitated by the accompanying metal oxides including titanium dioxide. Accordingly, if the amount of any one of the catalytically active components is too small or if the difference between the amount of two different catalytically active components is large, a disruption is brought about in the balance between the reducing power of $H_2S$ and the oxidizing power of oxygen within the catalyst, resulting in inactivating the catalyst. Particularly at low temperatures, the activity of the catalyst may be rapidly decreased with time owing to poor reoxidation. Conventional vanadium-based catalysts inevitably experience such inactivation. In contrast, the catalyst of the present invention is not inactivated because the reoxidation of the catalyst by oxygen is facilitated by composite elements of the metal composite oxide other than vanadium, including titanium. In addition, the catalyst and method of the present invention can recover sulfur with high efficiency even in the condition containing a large volume of moisture.

From vanadium oxide, titanium dioxide and the other metal oxides, the catalyst is prepared into a mixed oxide or composite oxide form. Any preparation method may be used. Available as a precursor for the vanadium in the catalyst is $NH_4VO_3$, $VOCl_3$, $VOSO_4 \cdot 3H_2O$, or vanadium alkoxides. For providing the titanium component of the catalyst, $Ti(SO_4)_2 \cdot nH_{2l\ O}$, $TiCl_3$ or various titanium alkoxides may be used as a precursor. The titanium precursors may be of various phases. Any titanium precursors may be used if they are soluble in aqueous acid solutions, alcohol or other solutions.

By way of example, but not limitation, $NH_4VO_3$, $Ti[O(CH_2)_3CH_3]_4$, $Fe(NO_3)_3 \cdot 9H_2O$, or $(NH_4)_6Mo_7O_2$ or $Cr(NO_3)_3 \cdot 9H_2O$ is dissolved in an aqueous oxalic acid solution or nitric acid solution, followed by the removal of moisture by evaporation or precipitation to give a precursor solid of a multi-component metal composite containing vanadium and titanium, such as $V_aTi_bFe_cMo_dCr_eO_f$. (wherein, a,b,c,d,e and f are each as defined above.) Any known metal salt can be used as a precursor for the metal element of X, Y and Z.

Alternatively, a slurry of carrier particles such as solid silica is added to the solution which is then dried by evaporation to prepare an active catalyst precursor supported on the silica carrier.

An alkaline solution such an aqueous $NH_4OH$ solution is also useful for the preparation of the catalyst. Introduction of the alkaline solution to the reaction solution gives precipitates which can be used as the catalyst after being filtered off. In another preparation method, an aqueous $NH_4VO_3$ solution is added with a slurry of titanium dioxide, followed by evaporation drying or precipitating to give final precursor solids.

The multi-component metal composite oxide precursor solid obtained by any of the preparation method is sintered at 400–500° C. in the air or in an oxygen atmosphere to produce a multi-component metal composite oxide catalyst containing vanadium and titanium.

Catalysts having chemical formula, $V_aTi_bFe_cMo_dO_f$ and $V_aTi_bFe_cMo_dCr_eO_f$(wherein, a,b,c,d,e and f are each as defined the above) are preferable.

Preferably, the amount of vanadium in the catalysts is 10 to 50 wt% of titanium and weight ratio of amount of each metal element for X, Y and Z to vanadium is 1:5 to 1:3.

In the presence of the catalyst, a hydrogen sulfide-containing gas is reacted with oxygen or air at 200–350° C. to oxidize hydrogen sulfide to elemental sulfur. The control of the reaction temperature is very important to increase the total sulfur-recovery efficiency. For example, if the reaction temperature is lowered to less than 200° C., the catalyst is inactivated. On the other hand, if the reaction temperature exceeds 350° C., the sulfur yield is decreased.

A better understanding of the present invention may be obtained in light of the following examples which are set forth to illustrate, but are not to be construed to limit the present invention.

EXAMPLE 1

In 500 ml of a 3–7 wt % aqueous oxalic acid solution, 2.34 g of $NH_4VO3$, 6.8 g of $Ti[O(CH_2)_3CH_3]_4$ and 2.50 g of $Fe(NO_3)_3 \cdot 9H_2O$ were dissolved as precursors for vanadium, titanium and iron, respectively, to give a clear solution from which the moisture was removed by evaporation drying. The residue was sintered at 450° C. for 5 hours in the air to produce a ternary component oxide catalyst containing vanadium, titanium and iron.

EXAMPLE 2

In 500 ml of a 3–7 wt % aqueous nitric acid solution, 8.7 g of $VOSO_4 \cdot 3H_2O$, 13.3 g of $Ti(SO_4)_2 \cdot 4H_2O$ and 6.43 g of $Fe(NO_3)_3 \cdot 9H_2O$ were dissolved as precursors for vanadium, titanium and iron, respectively, to give a clear solution which was then added with 16 g of a slurry of silica particles and dehydrated by evaporation drying. The solid thus obtained was sintered under the same condition as in Example 1. In the resulting catalyst, the catalytically active metal components vanadium, titanium and iron were supported onto silica at amounts of 10, 10 and 5 wt % based on the total weight of the catalyst.

EXAMPLE 3

500 ml of a 13 wt % aqueous nitric acid solution was added with 2.3 g of $NH_4VO_3$ and 7.1 g of $Ti[O(CH_2)_3CH_3]_4$ and then, with 2.53 g of $Fe(NO_3)_3 \cdot 9H_2O$, 1.27 g of $(NH_4)_6Mo_7O_2$, and 1.15 g of $Cr(NO_3)_3 \cdot 9H_2O$. The resulting clear solution was allowed to precipitate solids which were filtered. The filtrate was sintered at 500° C. for 5 hours in the air to produce a multi-component metal composite oxide catalyst containing vanadium, titanium, iron and molybdenum.

EXAMPLES 4 AND 5

Catalysts were prepared in the same manner as in Example 3, except that different metal types were used for the metal components except for vanadium and titanium. In Example 4, 0.615 g of $Bi_2(NO_3)_3 \cdot 5H_2O$, 1.83 g of $Zn(NO_3)_3 \cdot 6H_2O$, 0.43 g of $(NH_4)_6W_{12}O_{39} \cdot xH_2O$ were used as precursors for the different metal components. In Example 5, the precursors of the different metal components comprised 0.6 g of $SbCl_3$, 1.83 g of $Zn(NO3)_3 \cdot 6H_2O$ and 2.59 g of $Cr(NO_3)_3 \cdot 9H_2O$.

EXAMPLE 6

A clear multi-component metal precursor solution was obtained in the same manner as in Example 3, except that a 10 wt % aqueous nitric acid solution was used. After being added with silica particles, the metal precursor solution was dehydrated by evaporation drying to give a precursor solid. This was sintered at 500° C. for 5 hours to give a catalyst in which a multi-component metal composite oxide containing vanadium, titanium, iron, molybdenum and chrome was supported onto silica.

$VOSO_4 \cdot 3H_2O$ was used as a vanadium precursor, $Ti(SO_4)_2 \cdot 4H_2O$ as a titanium precursor, $Fe(NO_3)_3 \cdot 9H_2O$ as an iron precursor, $(NH_4)_6Mo_7O_2$ as a molybdenum precursor, and $Cr(NO_3)_3 \cdot 9H_2O$ as a chrome precursor.

EXAMPLE 7

A catalyst was prepared in the same manner as in Example 6, except that different metal types were used for the metal components except for vanadium and titanium. $MnCl_2 \cdot 4H_2O$, $SnCl_4$ and $(NH_4)_6W_{12}O_{39} \cdot xH_2O$ were used as precursors for the different metal components.

The multi-component metal composite oxides prepared in Examples 1 to 7 were summarized in the following Table 1.

TABLE 1

| Composition of Metal Composite Oxide Containing V and Ti (wt %) | | | | | | |
|---|---|---|---|---|---|---|
| Example No. | Catalyst | V | Ti | M1 | M2 | M3 | Carrier |
| Example 1 | VTiM-1 | 21.2 | 22.5 | Fe-14 | — | — | Absent |
| Example 2 | VTiM-2 | 10 | 10 | Fe-5 | — | — | $SiO_2$ |
| Example 3 | VTiM-3 | 20 | 20 | Fe-7 | Mo-3 | Cr-3 | Absent |
| Example 4 | VTiM-4 | 20 | 20 | Bi-7 | Zn-3 | W-3 | Absent |
| Example 5 | VTiM-5 | 20 | 20 | Sb-7 | Zn-3 | Cr-3 | Absent |
| Example 6 | VTiM-6 | 10 | 10 | Fe-3 | Mo-1.5 | Cr-1.5 | $SiO_2$ |
| Example 7 | VTiM-7 | 15 | 5 | Mn-5 | Sn-1.5 | W-1.5 | $SiO_2$ |

In Table 1, the term "VTiM" listed in the catalyst column represents a multi-component catalyst comprising vanadium, titanium and other metal elements. The accompanying number is to discern one from another. The same denomination will be applied, below.

EXAMPLES 8 TO 14

2 g of each of the multi-component metal composite oxide catalysts (80–100 mesh) prepared in Examples 1 to 7 was mixed with 20 g of glass beads (80–100 mesh) and charged in a fixed bed of a reactor. A mixed gas comprising 5 vol % of hydrogen sulfide, 2.5 vol % of oxygen and the remaining amount of helium was fed at a gas hourly space velocity (GHSV) of 94,000/hr in the temperature range of 225–325° C. The gas emitted from the reactor was cooled to 120° C. to collect sulfur and analyzed by gas chromatography. Measurement was made of the conversion rate of hydrogen sulfide, the selectivity for sulfur and the sulfur recovery rate at the outlet of the reactor under the normal condition. The results are given in Table 2, below.

TABLE 2

Conversion Rate from $H_2S$ to S, Selectivity for S and S-Recovery Rate According to Rxn Temp.

| Example No | Catalyst | Properties (%) | Reaction Temp (° C.) | | | | |
|---|---|---|---|---|---|---|---|
| | | | 225 | 250 | 275 | 300 | 325 |
| Example 8 | VTiM-1 | Conversion | 89.9 | 94 | 93 | 90 | 88 |
| | | Selectivity | 99 | 100 | 100 | 99 | 98 |
| | | Sulfur Recovery | 89.1 | 94 | 93 | 89.1 | 86.2 |
| Example 9 | VTiM-2 | Conversion | 89 | 94 | 93 | 91 | 88 |
| | | Selectivity | 99 | 100 | 100 | 97 | 96 |
| | | Sulfur Recovery | 88.1 | 94 | 93 | 88.3 | 84.5 |
| Example 10 | VTiM-3 | Conversion | 92 | 95 | 94 | 92 | 90 |
| | | Selectivity | 99 | 100 | 100 | 99 | 98 |
| | | Sulfur Recovery | 91.1 | 95 | 94 | 91.1 | 88.2 |
| Example 11 | VTiM-4 | Conversion | 91 | 93 | 92 | 91 | 90 |
| | | Selectivity | 99 | 100 | 100 | 99 | 98 |
| | | Sulfur Recovery | 90.1 | 93 | 92 | 90.1 | 88.2 |
| Example 12 | VTiM-5 | Conversion | 89 | 92 | 91 | 90 | 90 |
| | | Selectivity | 99 | 100 | 100 | 98 | 98 |
| | | Sulfur Recovery | 88.1 | 92 | 91 | 88.2 | 88.2 |
| Example 13 | VTiM-6 | Conversion | 92 | 94 | 94 | 92 | 91 |
| | | Selectivity | 99 | 100 | 99 | 98 | 98 |
| | | Sulfur Recovery | 91.1 | 94 | 93.1 | 90.2 | 89.2 |
| Example 14 | VTiM-7 | Conversion | 88 | 92 | 91 | 90 | 88 |
| | | Selectivity | 99 | 100 | 99 | 98 | 97 |
| | | Sulfur Recovery | 87.1 | 92 | 90.1 | 88.2 | 85.4 |

As is apparent from Table 2, the catalysts according to the present invention have sulfur-recovery rates ranging from 87 to 91%, which are higher than those reported in prior arts, at low temperatures less than 245° C. or less. In the high temperature range of 245° C. or higher, the catalysts of the present invention exhibit high sulfur-recovery rates ranging from 85 to 95%.

EXAMPLES 15 TO 20

The catalysts prepared in Examples 1 to 7 were tested for the conversion rate, selectivity and sulfur-recovery rate under the same condition as in Examples 8 to 14, except that moisture was added at an amount of 30 vol % to the reaction gas. The results are given in Table 3, below.

TABLE 3

Removal Efficiency of $H_2S$ in the Presence of 30 vol % of Moisture According to Temp.

| Example No. | Catalyst | Properties (%) | Reaction Temp (° C.) | | | | |
|---|---|---|---|---|---|---|---|
| | | | 225 | 250 | 275 | 300 | 325 |
| Example 15 | VTiM-1 | Conversion | 86 | 85 | 83 | 75 | 67 |
| | | Selectivity | 93 | 94 | 92 | 85 | 80 |
| | | Sulfur Recovery | 80 | 79.9 | 76.4 | 63.8 | 53.6 |
| Example 16 | VTiM-3 | Conversion | 85 | 85 | 83 | 77 | 67 |
| | | Selectivity | 96 | 96 | 94 | 89 | 85 |
| | | Sulfur Recovery | 81.6 | 81.6 | 78 | 68.5 | 57 |
| Example 17 | VTiM-4 | Conversion | 84 | 87 | 82 | 78 | 70 |
| | | Selectivity | 98 | 97 | 93 | 89 | 83 |
| | | Sulfur Recovery | 82.3 | 84.4 | 76.3 | 69.4 | 58.1 |
| Example 18 | VTiM-5 | Conversion | 80 | 84 | 78 | 76 | 69 |
| | | Selectivity | 98 | 98 | 93 | 88 | 82 |
| | | Sulfur Recovery | 78.4 | 82.3 | 72.5 | 66.9 | 56.6 |
| Example 19 | VTiM-6 | Conversion | 86 | 85 | 83 | 76 | 68 |
| | | Selectivity | 96 | 95 | 93 | 88 | 82 |
| | | Sulfur Recovery | 82.6 | 80.8 | 77.2 | 66.9 | 55.8 |
| Example 20 | VTiM-7 | Conversion | 80 | 81 | 75 | 69 | 65 |
| | | Selectivity | 91 | 92 | 91 | 85 | 78 |
| | | Sulfur Recovery | 72.8 | 74.5 | 68.3 | 58.7 | 50.7 |

Even in the presence of excess moisture, as is apparent from Table 3, the catalysts according to the present invention show sulfur recovery rates higher than those reported in prior arts and have sufficient catalytic activity. Although showing a tendency toward decreased sulfur-recovery rate at a high temperature range, the catalysts according to the present invention maintain their sulfur-recovery rates at a level of 72% or higher when the temperature is controlled in the range of 220–270° C.

EXAMPLE 21

To 200 ml of distilled water were added 3.45 g of $VOCl_3$ and 2.89 g of $Fe(NO_3)_3.9H_2O$ to give a clear solution. This solution was added with 9.1 g of a slurry of titanium dioxide and dehydrated by distillation drying. The residue was sintered at 400° C. for 5 hours in air to produce a catalyst in which vanadium and iron were supported onto titanium dioxide at amounts of 10 and 4 wt %, respectively, based on the total weight of the catalyst.

EXAMPLE 22

In 500 ml of a 10 wt % aqueous nitric acid solution, 5.46 g of $Fe(NO_3)_3.9H_2O$, 3.45 g of $NH_4VO_3$, 2.88 g of $Cr(NO_3)_3.9H_2O$ and 0.69 g of $(NH_4)_6Mo_7O_2$ were dissolved in that order. To the resulting solution was added 12 g of a slurry of titanium dioxide particles. After slow addition of a 30 wt % aqueous $NH_4OH$ solution, the multi-component metal precursor solid was obtained as a precipitate. After being filtered off, the metal precursor was sintered at 500° C. for 5 hours in air to produce a catalyst in which vanadium, iron, molybdenum and chrome were contained at amounts of 10, 5, 2.5 and 2.5 wt %, respectively, based on the total weight of the catalyst.

EXAMPLES 23 TO 26

Catalysts were prepared in the same manner as in Example 22, except that different metal types were used for the metal components except for vanadium. In Example 23, $Fe(NO_3)_3 \cdot 9H_2O$, $Zn(NO_3)_3 \cdot 6H_2O$ and $CsSO_4$ were used as precursors for the different metal components. The precursor of the different metal components included, $Bi_2(NO_3)_3 \cdot 5H_2O$, $(NH_4)_6Mo_7O_2$ and $Cr(NO_3)_3 \cdot 9H_2O$ for Example 24, $Bi_2(NO_3)_3 \cdot 5H_2O$, $Zn(NO_3)_3 \cdot 6H_2O$ and $CsSO_4$ for Example 25, and $MnCl_2 \cdot 4H_2O$, $Zn(NO_3)_3 \cdot 6H_2O$ and $Cr(NO_3)_3 \cdot 9H_2O$ for Example 26.

The multi-component metal composite oxides prepared in Examples 21 to 26 were summarized in Table 4, below.

TABLE 4

Composition of Multi-Component Metal Composite Oxide Catalyst which Vanadium Supported on $TiO_2$ (wt %)

| Example No. | Catalyst | V | M1 | M2 | M3 | Carrier |
|---|---|---|---|---|---|---|
| Example 21 | VTiM-8 | 10 | F2-4 | — | — | $TiO_2$ |
| Example 22 | VTiM-9 | 10 | Fe-5 | Mo-2.5 | Cr-2.5 | $TiO_2$ |
| Example 23 | VTiM-10 | 10 | Fe-5 | Zn-2.5 | Cs-2.5 | $TiO_2$ |
| Example 24 | VTiM-11 | 10 | Bi-5 | Mo-2.5 | Cr-2.5 | $TiO_2$ |
| Example 25 | VTiM-12 | 10 | Bi-5 | Zn-2.5 | Cs-2.5 | $TiO_2$ |
| Example 26 | VTiM-13 | 10 | Mn-7 | Zn-3 | Cr-3 | $TiO_2$ |

EXAMPLES 27 TO 32

The catalysts supported on titanium dioxide, prepared in Examples 21 to 26, were charged in a reactor and then, tested for the conversion rate, selectivity and sulfur-recovery rate under the same condition as in Example 9. The results are given in Table 5, below.

TABLE 5

Removal Efficiency of $H_2S$ by Catalyst Supported on $TiO_2$ According to Temp.

| Example No | Catalyst | Properties (%) | 225 | 250 | 275 | 300 | 325 |
|---|---|---|---|---|---|---|---|
| Example 27 | VTiM-8 | Conversion | 89 | 94 | 93 | 91 | 88 |
| | | Selectivity | 99 | 100 | 100 | 99 | 99 |
| | | Sulfur Recovery | 88.1 | 94 | 93 | 90.1 | 87.1 |
| Example 28 | VTiM-9 | Conversion | 92 | 96 | 94 | 93 | 90 |
| | | Selectivity | 99 | 100 | 100 | 99 | 98 |
| | | Sulfur Recovery | 91.1 | 96 | 94 | 92.1 | 88.2 |
| Example 29 | VTiM-10 | Conversion | 91 | 93 | 92 | 91 | 90 |
| | | Selectivity | 98 | 99 | 99 | 99 | 98 |
| | | Sulfur Recovery | 89.2 | 92.1 | 91.1 | 90.1 | 88.2 |
| Example 30 | VTiM-11 | Conversion | 90 | 94 | 94 | 91 | 88 |
| | | Selectivity | 99 | 100 | 100 | 99 | 99 |
| | | Sulfur Recovery | 89.1 | 94 | 94 | 90.1 | 87.1 |
| Example 31 | VTiM-12 | Conversion | 89 | 94 | 93 | 91 | 88 |
| | | Selectivity | 98 | 100 | 99 | 98 | 98 |
| | | Sulfur Recovery | 87.2 | 94 | 92.1 | 89.2 | 86.2 |
| Example 32 | VTiM-13 | Conversion | 87 | 92 | 91 | 90 | 86 |
| | | Selectivity | 98 | 100 | 100 | 99 | 99 |
| | | Sulfur Recovery | 85.3 | 92 | 91 | 89.1 | 85.1 |

As is apparent from Table 5, the catalysts according to the present invention have sulfur-recovery rates ranging from 85 to 96%, which are higher than those reported in prior arts, at low temperatures less than 245° C. or less. In the high temperature range of 245° C. or higher, the catalysts of the present invention exhibit high sulfur-recovery rates ranging from 85 to 96% unlike conventional catalysts.

EXAMPLES 33 TO 38

The catalysts prepared in Examples 27 to 32 were tested for the conversion rate, selectivity and sulfur-recovery rate under the same condition as in Examples 8 to 14, except that moisture was added at an amount of 30 vol % to the reaction gas. The results are given in Table 6, below.

TABLE 6

Removal Efficiency of $H_2S$ by Catalyst Supported on $TiO_2$ in the Presence of 30 vol % of Moisture According to Temp.

| Example No. | Catalyst | Properties (%) | 225 | 250 | 275 | 300 | 325 |
|---|---|---|---|---|---|---|---|
| Example 33 | VTiM-8 | Conversion | 84 | 84 | 82 | 75 | 66 |
| | | Selectivity | 94 | 94 | 91 | 88 | 86 |
| | | Sulfur Recovery | 79.0 | 79.0 | 74.6 | 66 | 56.8 |
| Example 34 | VTiM-9 | Conversion | 88 | 90 | 85 | 80 | 74 |
| | | Selectivity | 97 | 97 | 95 | 90 | 84 |
| | | Sulfur Recovery | 85.4 | 87.3 | 80.8 | 72 | 62.2 |
| Example 35 | VTiM-10 | Conversion | 86 | 88 | 83 | 78 | 72 |
| | | Selectivity | 97 | 98 | 96 | 89 | 82 |
| | | Sulfur Recovery | 83.4 | 86.2 | 79.7 | 69.4 | 59 |
| Example 36 | VTiM-11 | Conversion | 83 | 85 | 80 | 75 | 69 |
| | | Selectivity | 95 | 95 | 93 | 88 | 82 |
| | | Sulfur Recovery | 78.9 | 80.8 | 74.4 | 66 | 56.6 |
| Example 37 | VTiM-12 | Conversion | 83 | 84 | 81 | 75 | 69 |
| | | Selectivity | 95 | 95 | 93 | 89 | 82 |
| | | Sulfur Recovery | 78.9 | 79.8 | 75.3 | 66.8 | 56.6 |
| Example 38 | VTiM-13 | Conversion | 82 | 84 | 81 | 75 | 69 |
| | | Selectivity | 94 | 94 | 92 | 86 | 80 |
| | | Sulfur Recovery | 77.1 | 79.0 | 74.5 | 64.5 | 55.2 |

Even in the presence of excess moisture, as is apparent from Table 6, the catalysts according to the present invention show sulfur recovery rates higher than those reported in prior arts and have sufficient catalytic activity. Although showing a tendency toward decreasing in sulfur-recovery rate at an elevated temperature range, the catalysts according to the present invention maintain their sulfur-recovery rates at a level of 77% or higher when the temperature is controlled in the range of 220–270° C. Particularly, the catalyst VTiM-10 was measured to have an excellent sulfur-recovery rate of 87% or higher when the reaction temperature was maintained at 240–250° C.

EXAMPLES 39 AND 40

Each of the catalysts VTiM-8 and VTiM-9 was charged in a reactor into which a mixed gas comprising 5 vol % of hydrogen sulfide, 2.5 vol % of oxygen and the remaining amount of helium was fed at a GHSV of 94,000/hr at 250° C. Both in the absence of moisture and in the presence of 30 vol % of moisture, the catalysts were tested for hydrogen sulfide conversation rate and sulfur-recovery rate depending on the ratio of oxygen/hydrogen sulfide. The results are given in Table 7, below.

TABLE 7

H₂S Removal Rate of VTiM-8 and VTiM-9 according to Ratio of O₂/H₂S

| Example No. | Catalyst | Moisture Content (Vol %) | Properties (%) | Ratio of O₂/H₂S | | | | |
|---|---|---|---|---|---|---|---|---|
| | | | | 0.4 | 0.5 | 0.6 | 0.8 | 1.0 |
| Example 39 | VTiM-8 | 0 | Conversion | 90 | 93 | 98 | 99 | 99 |
| | | | Selectivity | 100 | 100 | 92 | 86 | 80 |
| | | | Sulfur Recovery | 90 | 93 | 90.2 | 85.1 | 79.2 |
| | | 30 | Conversion | 73 | 85.5 | 95 | 97 | 98 |
| | | | Selectivity | 99 | 96 | 85 | 70 | 60 |
| | | | Sulfur Recovery | 72.3 | 82.1 | 80.8 | 67.9 | 58.8 |
| Example 40 | VTiM-9 | 0 | Conversion | 93 | 96 | 98 | 100 | 100 |
| | | | Selectivity | 100 | 100 | 94 | 86 | 81 |
| | | | Sulfur Recovery | 93 | 96 | 92.1 | 86 | 81 |
| | | 30 | Conversion | 80 | 90 | 98 | 98 | 99 |
| | | | Selectivity | 100 | 97 | 86 | 81 | 71 |
| | | | Sulfur Recovery | 80 | 87.3 | 84.3 | 79.4 | 70.3 |

The data of Table 7 shows that, when oxygen is present at an amount less than the stoichiometric equivalent required according to the Reaction Formula 2, the selectivity increases to as high as 100%, but the conversion rate is lowered whereas a reverse tendency is seen in the presence of greater amounts of oxygen. Thus, when the equivalent ratio of oxygen to hydrogen sulfide is controlled to the stoichiometry (0.5) shown in the Reaction Formula 2, an optimal sulfur-recovery rate can be obtained. In this case, even if moisture is present at an amount of 30 vol %, the reduction% of the sulfur-recovery rate is measured to be reduced only by 10%.

EXAMPLES 41 AND 42

The catalysts VTiM-2 and VTiM-9 were tested for hydrogen sulfide conversion rate and sulfur-recovery rate depending on the concentrations of hydrogen sulfide under the same condition as in Example 9, except that the ratio of oxygen/hydrogen sulfide was 0.5. The results are given in Table 8, below.

TABLE 8

H₂S Removal Rate of VTiM-2 and VTiM-9 According to Concentration of H₂S

| Example No. | Catalyst | Properties (%) | H₂S Conc. (Vol %) | | | |
|---|---|---|---|---|---|---|
| | | | 5 | 10 | 20 | 40 |
| Example 41 | VTiM-2 | Conversion | 93 | 94 | 96 | 97 |
| | | Selectivity | 100 | 100 | 99 | 98 |
| | | Sulfur Recovery | 93 | 94 | 95.0 | 95.1 |
| Example 42 | VTiM-9 | Conversion | 96 | 97 | 98 | 99 |
| | | Selectivity | 100 | 100 | 99 | 98 |
| | | Sulfur Recovery | 96 | 97 | 97.0 | 97.0 |

EXAMPLES 43 TO 48

To compare catalytic activity between the multi-component metal composite oxide catalysts containing vanadium and titanium according to the present invention and conventional catalysts including $V_2O_5/SiO_2$ and $V_2O_5$—$Bi_2O_3$, they were tested for hydrogen sulfide conversion rate and sulfur-recovery rate depending on reaction time under the same condition as in Example 9, except that the reaction was conducted at 240° C. in the presence of 30 vol % of moisture. The results are given in Table 9, below.

COMPARATIVE EXAMPLE 1

In 200 ml of a 5 wt % aqueous oxalic acid solution was dissolved 3.44 g of $NH_4VO_3$, after which 3.43 g of silica particles was added. Dehydration by evaporation drying gave a precursor solid which was then sintered at 400° C. for 5 hours to produce a catalyst in which metal vanadium was supported onto silica at an amount of 30 vol % based on the total weight of the catalyst(hereinafter referred to as "V(30)/$SiO_2$").

COMPARATIVE EXAMPLE 2

Commercially available bulk $V_2O_5$ was treated under the same sintering condition as in Example 54 and tested.

COMPARATIVE EXAMPLE 3

200 ml of a 5 wt % aqueous oxalic acid solution was added with 1.17 g of $NH_4VO_3$ and 3.5 g of $Bi_2(NO_3)_3.5H_2O$ and dried by evaporation. After sintering at 450° C. for 5 hours in the air, a catalyst was prepared (hereinafter referred to as "$V_2O_5$—$Bi_2O_3$").

TABLE 9

H₂S Removal Rate of Catalyst According to Reaction Time

| Example No. | Catalyst | Properties (%) | Reaction Time (hours) | | | | | | | | |
|---|---|---|---|---|---|---|---|---|---|---|---|
| | | | 5 | 10 | 20 | 30 | 40 | 50 | 60 | 70 | 80 |
| Example 43 | VTiM-1 | Conversion | 87 | 87 | 87 | 87 | 87 | 86 | 87 | 87 | 86 |
| | | Selectivity | 97 | 97 | 97 | 97 | 97 | 97 | 96 | 97 | 96 |
| | | S-Recovery | 84.4 | 84.4 | 84.4 | 84.4 | 84.4 | 83.4 | 83.5 | 84.4 | 82.6 |

TABLE 9-continued

H₂S Removal Rate of Catalyst According to Reaction Time

| Example No. | Catalyst | Properties (%) | \multicolumn{9}{c}{Reaction Time (hours)} | | | | | | | | |
|---|---|---|---|---|---|---|---|---|---|---|---|
| | | | 5 | 10 | 20 | 30 | 40 | 50 | 60 | 70 | 80 |
| Example 44 | VTiM-2 | Conversion | 86 | 86 | 86 | 86 | 86 | 85 | 86 | 86 | 85 |
| | | Selectivity | 97 | 97 | 97 | 96 | 97 | 97 | 97 | 97 | 97 |
| | | S-Recovery | 83.4 | 83.4 | 83.4 | 82.6 | 83.4 | 82.5 | 83.4 | 83.4 | 82.5 |
| Example 45 | VTiM-3 | Conversion | 85 | 85 | 85 | 85 | 85 | 77 | 85 | 85 | 84 |
| | | Selectivity | 96 | 96 | 96 | 96 | 96 | 96 | 95 | 96 | 95 |
| | | S-Recovery | 81.6 | 81.6 | 81.6 | 81.6 | 81.6 | 74.0 | 80.8 | 81.6 | 79.8 |
| Example 46 | VTiM-6 | Conversion | 85 | 85 | 85 | 85 | 85 | 84 | 85 | 85 | 84 |
| | | Selectivity | 95 | 95 | 95 | 94 | 95 | 95 | 95 | 95 | 95 |
| | | S-Recovery | 80.8 | 80.8 | 80.8 | 79.9 | 80.8 | 79.8 | 80.8 | 80.8 | 79.8 |
| Example 47 | VTiM-10 | Conversion | 90 | 89 | 89 | 88 | 89 | 90 | 88 | 88 | 89 |
| | | Selectivity | 98 | 97 | 98 | 97 | 97 | 98 | 97 | 98 | 97 |
| | | S-Recovery | 88.2 | 86.3 | 87.2 | 85.4 | 86.3 | 88.2 | 85.4 | 86.2 | 86.3 |
| Example 48 | VTiM-12 | Conversion | 85 | 85 | 84 | 85 | 84 | 84 | 83 | 84 | 83 |
| | | Selectivity | 95 | 96 | 96 | 95 | 96 | 95 | 95 | 96 | 95 |
| | | S-Recovery | 80.8 | 81.6 | 80.6 | 80.8 | 80.6 | 79.8 | 78.9 | 80.6 | 78.9 |
| C. Example 1 | V(30)/SiO₂ | Conversion | 85 | 85 | 82 | 70 | 58 | 53 | 46 | 32 | 14 |
| | | Selectivity | 98 | 99 | 98 | 97 | 98 | 98 | 99 | 99 | 100 |
| | | S-Recovery | 83.3 | 84.2 | 80.4 | 67.9 | 56.8 | 51.9 | 45.5 | 31.7 | 14 |
| C. Example 2 | Bulk V₂O₅ | Conversion | 92 | 90 | 89 | 87 | 77 | 62 | 45 | 32 | 14 |
| | | Selectivity | 97 | 96 | 97 | 97 | 97 | 97 | 98 | 98 | 100 |
| | | S-Recovery | 89.2 | 86.4 | 86.3 | 84.4 | 74.7 | 60.1 | 44.1 | 31.4 | 14 |
| C. Example 3 | V₂O₅—Bi₂O₃ | Conversion | 34 | 25 | 18 | — | — | — | — | — | — |
| | | Selectivity | 97 | 99 | 100 | — | — | — | — | — | — |
| | | S-Recovery | 33.0 | 24.8 | 18 | — | — | — | — | — | — |

As shown in Table 9, the multi-component metal composite oxide catalysts containing vanadium and titanium according to the present invention can maintain the sulfur-recovery rate at a level of about 80–88% at low temperatures after a long working period of time without being deteriorated in catalytic activity. In contrast, the catalysts suggested in prior arts, $V_2O_5$, $V_2O_5/SiO_2$ and $V_2O_5$—$Bi_2O_3$, were observed to sharply decrease in catalytic activity with accumulated working time.

As described hereinbefore, the catalyst and method for recovering elemental sulfur by the selective oxidation of hydrogen sulfide is highly effective in a relatively broad temperature range (220–330° C.). The catalyst maintains its high catalytic activity for a long period of time and the high catalyst activity is maintained even when excess water is present in the reaction gas.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A catalyst for selectively oxidizing hydrogen sulfide to elemental sulfur in a reaction gas, represented by the following chemical formula:

$$V_a Ti_b X_c O_f$$

wherein,
 a is such a mole number that vanadium amounts to 5–40% by weight based on the total weight of the catalyst;
 b is such a mole number that titanium amounts to 5–40% by weight based on the total weight of the catalyst;
 X is an element selected from the group consisting of Fe, Mn, Co, Ni and Bi;
 c is such a mole number that X amounts to 15% by weight or less based on the total weight of the catalyst; and
 f is such a mole number that oxygen is present to the final 100% by weight.

2. A catalyst for selectively oxidizing hydrogen sulfide to elemental sulfur in a reaction gas, represented by the following chemical formula:

$$V_a Ti_b X_c Z_e O_f$$

wherein,
 a is such a mole number that vanadium amounts to 5–40% by weight based on the total weight of the catalyst;
 b is such a mole number that titanium amounts to 5–40% by weight based on the total weight of the catalyst;
 X is an element selected from the group consisting of Fe, Mn, Co, Ni, Sb and Bi;
 c is such a mole number that X amounts to 15% by weight or less based on the total weight of the catalyst;
 Z is an element selected from the group consisting of Mg, Ca, Sr, Cs, La, Ce and mixtures thereof;
 e is such a mole number that the element component Z amounts to 8% by weight or less based on the total weight of the catalyst; and
 f is such a mole number that oxygen is present to the final 100% by weight.

3. A catalyst for selectively oxidizing hydrogen sulfide to elemental sulfur in a reaction gas, represented by the following chemical formula:

$$V_a Ti_b Y_d O_f$$

wherein,
 a is such a mole number that vanadium amounts to 5–40% by weight based on the total weight of the catalyst;
 b is such a mole number that titanium amounts to 5–40% by weight based on the total weight of the catalyst;

Y is an element selected from the group consisting of Cr, Mo, W, Zr, Zn, Ce, Sn and mixtures thereof;

d is such a mole number that Y amounts to 8% by weight or less based on the total weight of the catalyst; and f is such a mole number that oxygen is present to the final 100% by weight.

4. The catalyst as set forth in claim 3, further containing an element component X selected from the group consisting of Fe, Mn, Co, Ni, Sb and Bi, represented by the following chemical formula:

$$V_a Ti_b X_c Y_d O_f$$

wherein, a, b, d, f and Y are each as defined in claim 3; and c is such a mole number that the element component X amounts to 15% by weight or less based on the total weight of the catalyst.

5. The catalyst as set forth in claim 4, further containing an element component Z selected from the group consisting of Mg, Ca, Sr, Cs, La, Ce and mixtures thereof, represented by the following chemical formula:

$$V_a Ti_b X_c Y_d Z_e O_f \qquad 3$$

wherein, a, b, c, d, f, X and Y are each as defined in claim 2; and e is such a mole number that the element component Z amounts to 8% by weight or less based on the total weight of the catalyst.

6. The catalyst as set forth in claim 3, further containing an element component Z selected from the groups consisting of Mg, Ca, Sr, Cs, La, Ce and mixtures thereof, represented by the following chemical formula:

$$V_a Ti_b Y_d Z_e O_f \qquad 6$$

wherein, a, b, d, f and Y are each as defined in claim 5; and e is such a mole number that the element component Z amounts to 8% by weight or less based on the total weight of the catalyst.

7. A method for recovering elemental sulfur, in which a reaction gas containing 0.5–40 vol % of hydrogen sulfide and 30 to 50 volume % of moisture is reacted with oxygen in the presence of a catalyst represented by the following chemical formula:

$$V_a Ti_b X_c O_f$$

wherein, a is such a mole number that vanadium amounts to 5–40% by weight based on the total weight of the catalyst;

b is such a mole number that titanium amounts to 5–40% by weight based on the total weight of the catalyst;

X is an element selected from the group consisting of Fe, Mn, Co, Ni, Sb and Bi;

c is such a mole number that X amounts to 15% by weight or less based on the total weight of the catalyst; and f is such a mole number that oxygen is present to the final 100% by weight.

8. The method as set forth in claim 7, wherein the reaction gas is reacted with oxygen at 200–350° C. and fed at gas hourly space velocity of 3,000–1,000,000/hr with a volume ratio of oxygen to hydrogen sulfide ranging from 0.5 to 1.

9. The method as set forth in claim 8, wherein the reaction gas is reacted with oxygen at 200–280° C. and fed at gas hourly space velocity of 3,000–400,000/hr with a volume ratio of oxygen to hydrogen sulfide ranging from 0.5 to 0.6.

10. A method for recovering elemental sulfur, in which a reaction gas containing 0.5–40 vol % of hydrogen sulfide and 30 to 50 vol % of moisture is reacted with oxygen in the presence of the catalyst of claim 4.

11. A method for recovering elemental sulfur, in which a reaction gas containing 0.5–40 vol % of hydrogen sulfide and 30 to 50 vol % of moisture is reacted with oxygen in the presence of the catalyst of claim 5.

12. A method for recovering elemental sulfur, in which a reaction gas containing 0.5–40 vol % of hydrogen sulfide and 30 to 50 vol % of moisture is reacted with oxygen in the presence of the catalyst of claim 2.

13. A method for recovering elemental sulfur, in which a reaction gas containing 0.5–40 vol % of hydrogen sulfide and 30 to 50 vol % of moisture is reacted with oxygen in the presence of the catalyst of claim 3.

14. A method for recovering elemental sulfur, in which a reaction gas containing 0.5–40 vol % of hydrogen sulfide and 30 to 50 vol % of moisture is reacted with oxygen in the presence of the catalyst of claim 6.

* * * * *

UNITED STATES PATENT AND TRADEMARK OFFICE
CERTIFICATE OF CORRECTION

PATENT NO.         : 6,506,356 B1
APPLICATION NO. : 09/685302
DATED              : January 14, 2003
INVENTOR(S)        : Jong Shik Chung et al.

It is certified that error appears in the above-identified patent and that said Letters Patent is hereby corrected as shown below:

Column 6
  Line 63, "Ti(SO$_4$)$_2$•nH$_{2lO.TiCl3}$" should read --Ti(SO$_4$)$_2$•nH$_2$O, TiCl$_3$--.

Column 7
  Line 55, "5 hours in the air" should read --5 hours in air--.

Column 12
  Line 65, "conversation rate" should read --conversion rate--.

Signed and Sealed this

Twentieth Day of March, 2007

JON W. DUDAS
*Director of the United States Patent and Trademark Office*